Dec. 4, 1928.
G. T. RONK
1,693,869
TRAILER FOR SELF PROPELLED VEHICLES
Filed Aug. 22, 1927
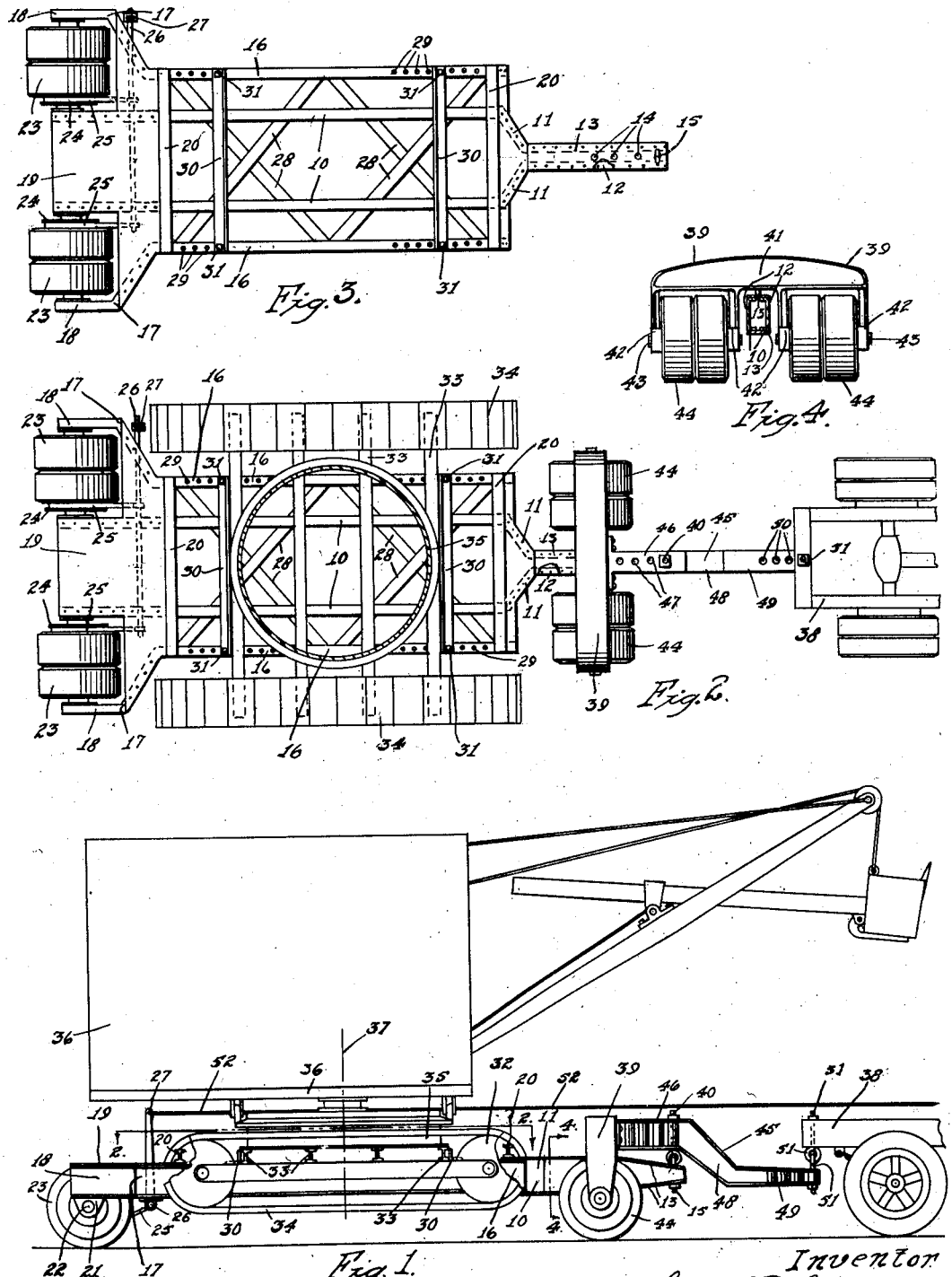

Patented Dec. 4, 1928.

1,693,869

UNITED STATES PATENT OFFICE.

GEORGE T. RONK, OF CEDAR RAPIDS, IOWA, ASSIGNOR TO SPEEDER MACHINERY CORPORATION, OF CEDAR RAPIDS, IOWA, A CORPORATION OF IOWA.

TRAILER FOR SELF-PROPELLED VEHICLES.

Application filed August 22, 1927. Serial No. 214,667.

This invention relates to trailers particularly adapted to be drawn by an automobile truck over highways, and to support and carry heavy machinery, such as ditching machines or the like.

Various states have enacted laws regulating the wheel loads of trailers. Some of these specify a maximum load for each inch in width of the wheel tread, while others specify a maximum and minimum axle load, depending on the number of axles used in multiple.

It is, therefore, the object of my invention to provide a trailer adapted to be drawn by the ordinary automobile truck, and to support and carry ditching machines of various sizes and weights, said trailer being so constructed and arranged that it may be easily and quickly adjusted to comply with the various State laws regulating wheel loads, and at the same time provide a truck of simple, durable and inexpensive construction, which is of comparatively light weight, and which is adapted to be used as a two or four wheeled trailer.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved four wheeled trailer showing the manner in which it is operatively connected to and drawn by an automobile truck.

Figure 2 is a plan view of the same.

Figure 3 is a plan view of the device as used as a two wheeled trailer.

Figure 4 is a detail sectional view taken on the line 4—4 of Figure 1.

Referring to the accompanying drawings, I will first describe the two wheeled trailer illustrated in Figure 3. Said trailer comprises a pair of parallel frame members 10 spaced apart and having their forward ends provided with inwardly bent portions 11 terminating in forwardly extending tongue portions 12, which are spaced a slight distance apart and connected together by means of plates 13 above and below the tongues 12. The plates 13 are provided with a series of holes 14 for receiving an eye bolt 15. Extending parallel with each of the frame members 10 is a frame member 16. The rear ends of the frame members 16 are provided with rearwardly and outwardly bent portions 17 which terminate in rearwardly extending portions 18. The members 17 and the rear ends of the members 10 are rigidly secured together by means of suitable plates 19, while the forward ends of the members 16 and the members 10 are secured together by cross members 20.

The rear ends of the members 10 and the members 18 are provided with boxings 21 having shafts 22 in which wheels 23 are mounted. The inner end of each of the axles 23 is provided with a brake drum 24 for receiving a brake band 25 of ordinary construction. Both of the bands 25 are operated by a suitable shaft 26 and an upwardly extending lever 27. Suitable cross braces 28 are also provided for the frame members 10 and 16. The members 16 are provided with holes 29 which provide means whereby transversely arranged bars 30 may be adjustably mounted thereon, so that the center of gravity of a load supported between the bars 30 may be adjusted toward or from either end of the frame members. The bars 30 are detachably secured in position by means of suitable bolts 31.

My improved trailer is particularly designed to be used for supporting and conveying ditching machines of that type having a truck 32 provided with transversely arranged frame members 33 designed to support crawling treads 34. The frame members 33 carry the usual annular frame member 35, in which the platform 36 is supported. The platform 36 is rotatively mounted on a vertical axis 37.

The width of the central portion of the trailer frame is such that its tongue may be moved beneath the frame members 33 until the outer ones of the frame members 33 are supported between the bars 30, in the manner illustrated in Figure 2, after which the free end of the tongue may be elevated, causing the ditcher tread members 34 to be lifted off of the ground surface. The free end of the tongue is designed to be supported by means of the eye bolts 15, either by the back end of a truck 38 or by means of an auxiliary trailer member 39. The eye bolt 15 is supported by means of an eye bolt 40 or other suitable means of attachment.

If a comparatively light ditching machine is being hauled, and the State laws regulating the same are such that the wheels 23 would not be overloaded, then the tongue is attached directly to the rear end of the truck 38 and thus providing what I shall term a two wheeled trailer. It is always desirable to carry as much of the weight on the wheels 23 as possible to relieve the load from the wheels of the truck 38. The proper loading of the wheels 23 may be accomplished by adjusting the bars 30 rearwardly or forwardly. This adjustment usually takes place in actual practice before the ditching machine is loaded, as it is easy to calculate the position of the ditching machine on the frame if the weight of the ditching machine is known. The proper placing of the center of the load on the trailer frame may be further adjusted by adjusting the eye bolt 15 in the holes 14, thereby increasing or decreasing the length of the tongue or the distance between the bolt 15 and the center of the wheels 23.

It sometimes happens that the State laws pertaining to the loading of wheels or axles are such that the wheels of the two wheeled trailer would be overloaded, in which case I have provided what I shall term the auxiliary trailer 39 which comprises a frame member 41, having two sets of downwardly extending bearing members 42, each set being provided with a shaft 43 for supporting the wheels 44. A considerable space is left between the inner bearing members 42 for receiving the tongue of the two wheeled trailer. Secured to the forward face of the beam 41 is a tongue 45 having a horizontal portion 46 provided with a series of vertical openings 47 for receiving the eye bolt 40. The forward end of the member 46 is provided with a downwardly extending portion 48 which terminated in a forwardly extending portion 49, which is also provided with vertical holes 50 for receiving eye bolts 51. The tongue of the two wheeled truck is supported between the inner bearing members 42 and by means of the eye bolts 15 and 40, while the forward end of the member 49 is supported to the truck 38 by means of the eye bolts 51.

By this arrangement it will be seen that a portion of the load carried by the forward end of the truck tongue will be carried by the trailer 39, and the other portion by the rear end of the truck 38. By providing the holes 46 means is provided whereby more or less of this load may be carried by the wheels 44. When the trailer 39 is used, the excavator frame is shifted forwardly so the forward end of the trailer frame supports a greater amount of the load than the rear end. The difference between the load carried by the wheels of the main trailer and the auxiliary trailer is carried by the eye bolts 51.

By this arrangement it will be seen that if the weight of the excavator is greater than the total load permitted to be carried by the wheels of the main trailer, and the auxiliary trailer combined, then by the proper shifting of the eye bolt 40 in the holes 47 the extra load may be carried by the truck 38, and by this arrangement provide means whereby the excavator may be transported over the highways without violating the laws regulating the loading of wheels of trailers, and without having to disassemble a portion of the excavator machine.

By this arrangement I have provided a trailer construction which is capable of being adapted to meet the requirements of the laws of various States pertaining to the loading of trailer wheels, without changing the construction of the trailer in such a manner that the excavator may be conveyed from one State to another, and the trailer adapted to be easily and quickly adjusted and arranged to meet the various requirements when passing from one State to another. It often happens that the two wheeled trailer is sufficient to comply with the laws, in which case the expense of the auxiliary trailer is eliminated.

By providing the brake drums 24 on the wheels 23 and the lever 27 for operating the same, I have provided means whereby braking action may be applied to said wheels by means of a suitable rope or cable 52, which may be used in conjunction with the brakes of the truck 38, and thereby providing means whereby the trailers will be prevented from running ahead of the truck as the truck and trailers are operated down a hill.

I claim as my invention:

1. A trailer comprising a platform having a rigid tongue at one end and supporting wheels at its opposite end, a second trailer member for supporting the forward end of said tongue, said second trailer being provided with a rigid tongue, means for supporting the forward end of the last said tongue, the forward end of the first said tongue being supported by the second said tongue, and means for adjustably connecting the first said tongue with the second said tongue.

2. A trailer comprising a platform having a rigid tongue at one end and supporting wheels at its opposite end, a second trailer comprising a transversely arranged frame member supported above the tongue of the first said trailer, wheels supporting each end of said transversely arranged frame member, said transversely arranged frame member being provided with a forwardly extending tongue having a series of holes between its ends, a bolt for said holes, means for connecting said bolt to the forward end of the tongue of the first said trailer, and means for connecting the forward end of the second said tongue with the truck.

3. A trailer comprising a platform having a rigid tongue at one end and supporting wheels at its opposite end, a second trailer comprising a transversely arranged frame member supported above the tongue of the first said trailer, wheels supporting each end of said transversely arranged frame member, said transversely arranged frame member being provided with a forwardly extending tongue having a series of holes between its ends, a bolt for said holes, means for connecting said bolt to the forward end of the tongue of the first said trailer, means for connecting the forward end of the second said tongue with the truck, and adjustable means carried by said platform of the first said trailer for supporting a load against forward and rearward movement thereon.

4. A trailer comprising a platform formed of a pair of spaced parallel frame members having their forward ends terminating in a tongue portion, a frame member outside of each of the first said frame members, cross members connecting said frame members, the rear ends of said outside frame members extending outwardly and rearwardly and terminating in rearwardly extending portions, the rear ends of said frame members being provided with wheel axles, and wheels on said axles.

5. A trailer comprising a platform formed of a pair of spaced parallel frame members having their forward ends terminating in a tongue portion, a frame member outside of each of the first said frame members, cross members for connecting said frame members, the rear ends of said outside frame members extending outwardly and rearwardly and terminating in rearwardly extending portions, the rear ends of said frame members being designed to support wheel axles, wheels for said axles, said tongue portion being provided with vertical holes, and adjustable means carried by said platform for supporting an excavator mounted thereon against rearward and forward movement on said platform.

6. In combination, a main trailer, an auxiliary trailer, and a truck, means pivotally connecting the auxiliary trailer to said truck, means pivotally connecting the main trailer to said auxiliary trailer, brake applying means carried by the rear one of said trailers, means adjustably connecting said auxiliary trailer to said truck, and means adjustably connecting the main trailer to said auxiliary trailer to increase or decrease the length of the hitch of said trailers.

7. In combination, a main trailer, an auxiliary trailer, and a truck, means for pivotally connecting the auxiliary trailer to said truck, means for pivotally connecting the main trailer to said auxiliary trailer, brake applying means carried by the rear one of said trailers, means for adjustably connecting said auxiliary trailer to said truck, means for adjustably connecting the main trailer to said auxiliary trailer to increase or decrease the length of the hitch of said trailers, and adjustable means carried by the platform of the main trailer for supporting a load thereon against forward or rearward movement and for adjusting the center of gravity of said load between the rearward and forward ends of said trailer, for the purposes stated.

Des Moines, Iowa, August 10, 1927.
GEORGE T. RONK.